(12) United States Patent
Yang

(10) Patent No.: US 6,878,322 B2
(45) Date of Patent: Apr. 12, 2005

(54) METHOD FOR MANUFACTURING A RUBBER PRODUCT HAVING COLORED PATTERNS THEREON

(76) Inventor: Kuo-Chin Yang, No. 103-16, Jun Gong Road, Beei-Tun Dist., Taichung (TW)

( * ) Notice: Subject to any disclaimer, the term of this patent is extended or adjusted under 35 U.S.C. 154(b) by 50 days.

(21) Appl. No.: 10/384,620

(22) Filed: Mar. 11, 2003

(65) Prior Publication Data

US 2003/0183981 A1 Oct. 2, 2003

Related U.S. Application Data

(63) Continuation-in-part of application No. 09/749,537, filed on Dec. 28, 2000, now abandoned.

(51) Int. Cl.$^7$ ............................................. B29C 51/08
(52) U.S. Cl. ........................ 264/132; 264/247; 264/266; 264/275; 264/325
(58) Field of Search .................................. 264/275, 132, 264/245, 247, 266, 325

(56) References Cited

U.S. PATENT DOCUMENTS

| | | | | |
|---|---|---|---|---|
| 3,886,020 A | * | 5/1975 | Shank, Jr. .................... | 156/211 |
| 4,042,090 A | * | 8/1977 | Hasebe et al. .............. | 400/490 |
| D404,680 S | * | 1/1999 | Kahn .......................... | D11/95 |
| 6,156,411 A | * | 12/2000 | Jennings .................. | 428/195.1 |

FOREIGN PATENT DOCUMENTS

| JP | 60-31934 | * | 2/1985 |
|---|---|---|---|
| JP | 5-57710 | * | 3/1993 |

* cited by examiner

Primary Examiner—Edmund H. Lee

(57) ABSTRACT

A method for manufacturing rubber plate having colored patterns thereon includes step 1: to prepare a heat transfer decal having a colored pattern thereon, the color pattern including a plurality of slits located at corners of the colored pattern; step 2: to prepare a male mold and a rubber plate put on the male mold, the decal put on the rubber plate; step 3: to prepare a female mold having a recess defined therein, and step 4: to press the decal on the rubber plate between the male mold and the female mold at a high temperature. The pattern on the decal is printed on the rubber plate.

1 Claim, 5 Drawing Sheets

```
┌─────────────────────────────────────────────────────────┐
│ preparing a heat transfer decal having a colored pattern │
└─────────────────────────────────────────────────────────┘
                          Step 1
                            │
                            ▼
┌─────────────────────────────────────────────────────────┐
│ preparing a male mold and a rubber plate put on the      │
│ male mold, the decal put on the rubber plate             │
└─────────────────────────────────────────────────────────┘
                          Step 2
                            │
                            ▼
┌─────────────────────────────────────────────────────────┐
│ preparing a female mold having a recess defined therein  │
└─────────────────────────────────────────────────────────┘
                          Step 3
                            │
                            ▼
┌─────────────────────────────────────────────────────────┐
│ pressing the decal on the rubber plate between the male  │
│ mold and the female mold at a high temperature, the      │
│ pattern attached on an inside of the recess              │
└─────────────────────────────────────────────────────────┘
                          Step 4
```

FIG. 3

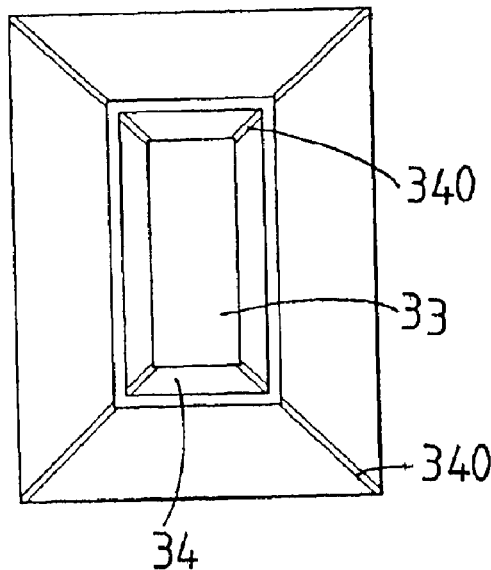
FIG. 4A
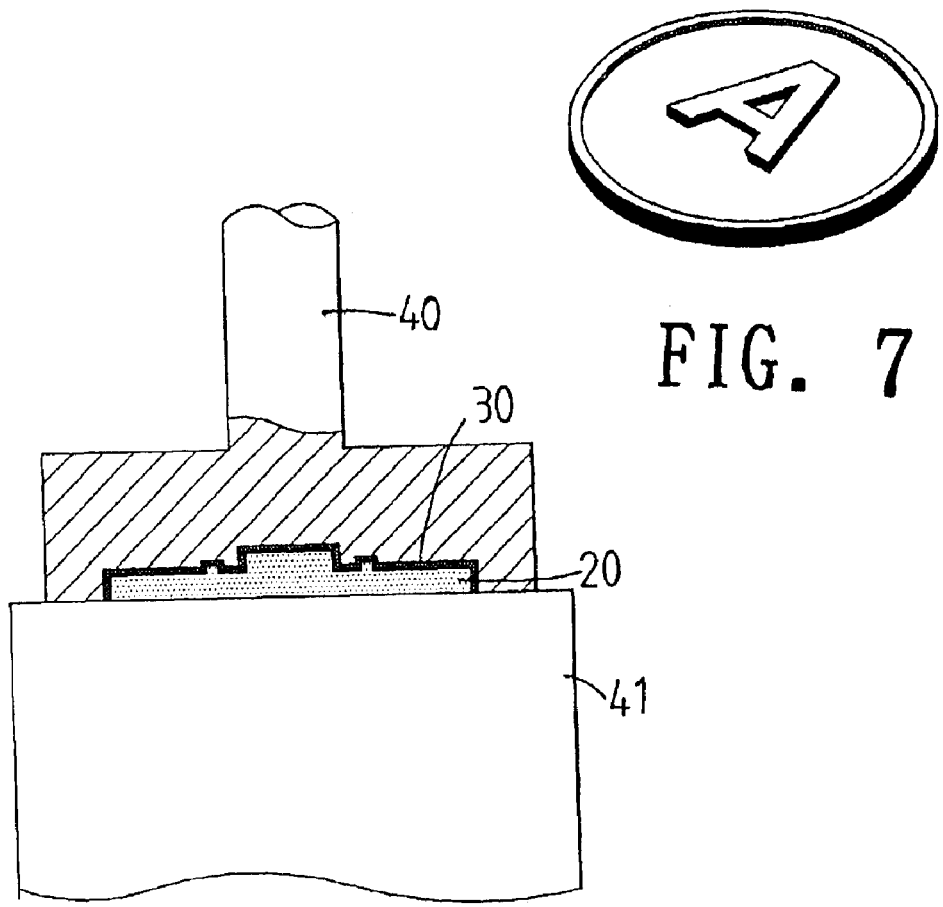
FIG. 7
FIG. 5

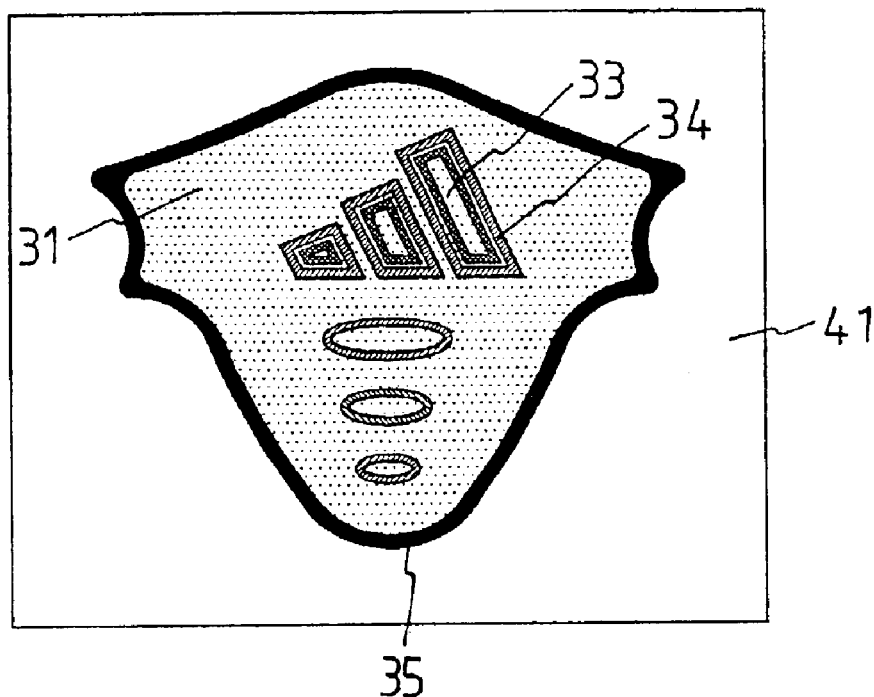
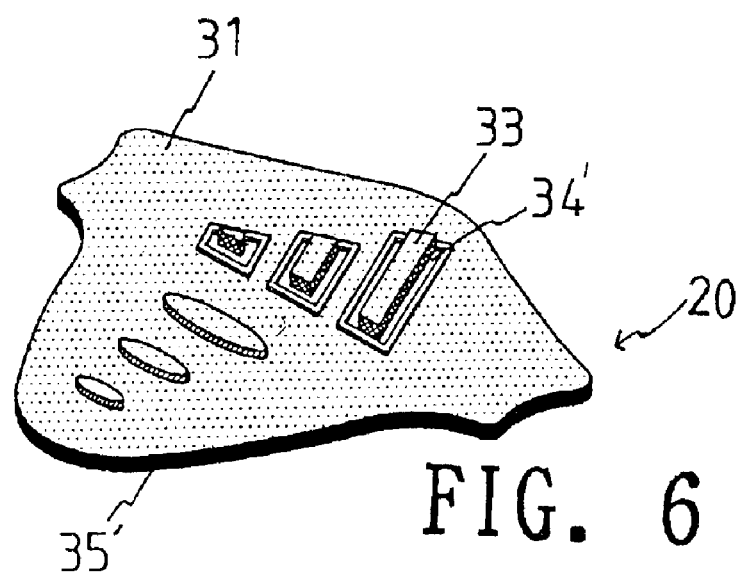
FIG. 6

METHOD FOR MANUFACTURING A RUBBER PRODUCT HAVING COLORED PATTERNS THEREON

FIELD OF THE INVENTION

This is a Continuation-In-Part application of applicant's former U.S. Pat. No. 09/749,537, filed on Dec. 28, 2000 now abandoned.

BACKGROUND OF THE INVENTION

Referring to FIGS. 1 and 2, a conventional rubber label used on coaster, trademark plate, sports shoes, key chain or zipper head is made by drawing a pattern 11 on a raw rubber plate 10, and then heating and pressing the rubber plate 10 by a male mold and a female mold. The male mold has a protrusion having exactly the same configure as the pattern, and the female mold has a recess having exactly the same configure as the pattern. By the punch action of the male and female mold, a rubber plate 13 is punched and separated from the raw rubber plate 10 and has the pattern on the surface thereof. Nevertheless, it is difficult to paint colors on the raw rubber and the colors tend to fade out. After the rubber plate 13 is punched from the raw rubber plate 10, the periphery 14 of the punched rubber plate 13 looses the colors which are cut by the molds so that the manufacturers have to paint the periphery 14 manually.

The present invention intends to provide a method for manufacturing a rubber plate having colored pattern thereon.

SUMMARY OF THE INVENTION

In accordance with one aspect of the present invention, there is provided a method for manufacturing rubber plate having colored patterns thereon. The method includes step 1 of preparing a heat transfer decal having a colored pattern thereon, the color pattern including a plurality of slits located at corners of the colored pattern; step 2 of preparing a male mold and a rubber plate put on the male mold, the decal put on the rubber plate; step 3 of preparing a female mold having a recess defined therein, and step 4 of pressing the decal on the rubber plate between the male mold and the female mold at a high temperature.

The primary object of the present invention is to provide a method that clearly prints colored patterns on a rubber plate.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 3 is a flow chart to show a method of the present invention for manufacturing a rubber plate having colored patterns thereon;

FIG. 4A shows slits defined at corners of the colored frame of the pattern on the decal;

FIG. 5 is a cross sectional view to show the decal in FIG. 4 is clamped between the male mold and the female mold;

FIG. 6 is a perspective view to show the rubber plate having the pattern made by the method of the present invention, and FIG. 7 is another embodiment of the rubber plate made by the method of the present invention.

DETAILED DESCRIPTION OF THE PREFERRED EMBODIMENTS

Figure 1:
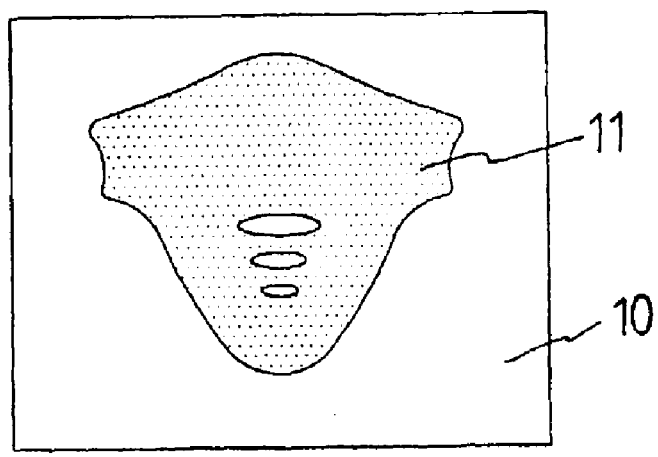
FIG. 1 is a plan view to show a conventional raw rubber plate with a pattern thereon.
Figure 2:
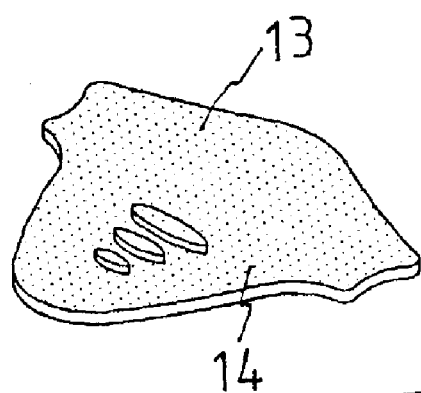
FIG. 2 is a perspective view to show a conventional rubber plate with the pattern thereon.

Referring to FIGS. 3, 4, 4A and 5, the method of the present invention for manufacturing a rubber plate having colored patterns thereon comprises the following steps:

step 1: preparing a heat transfer decal 30 having a colored pattern 31 thereon. The pattern 31 includes six enclosed marks and each of the enclosed marks has a blank portion 33 and a colored frame 34 encloses the blank portion 33. Each colored frame 34 includes a plurality of slits 340 defined through the decal 30 and the slits 340 are preferably located at corners of the colored frame 34.

step 2: preparing a male mold 41 and a rubber plate 20 put on the male mold 41. The decal 30 is put on the rubber plate 20. The rubber plate has six protrusions 200 step 3: preparing a female mold 40 having a recess 400 defined therein and six concavities 401 are defined in an inner surface of the recess 400 in the female mold 40. The configuration of the recess 400 is the same as the rubber plate 20. The width of the respective one of the colored frame 34 is equal to a depth of the respective one of the six concavities 401.

step 4: pressing the decal 30 on the rubber plate 20 between the male mold 41 and the female mold 40 at a high temperature. The rubber plate 20 is engaged with the recess 400 of the female mold 40 and the protrusions 200 are engaged with the concavities 401. The pattern 31 attached on the rubber plate 20 and the enclosed marks are attached on the protrusions 200. The colored frame 34 of each of the marks is printed on a periphery of the corresponding protrusion 200. The slits 340 allow the colored frame 34 to be smoothly wrapped on the periphery of the protrusions 200 without wrinkles.

Figure 4:
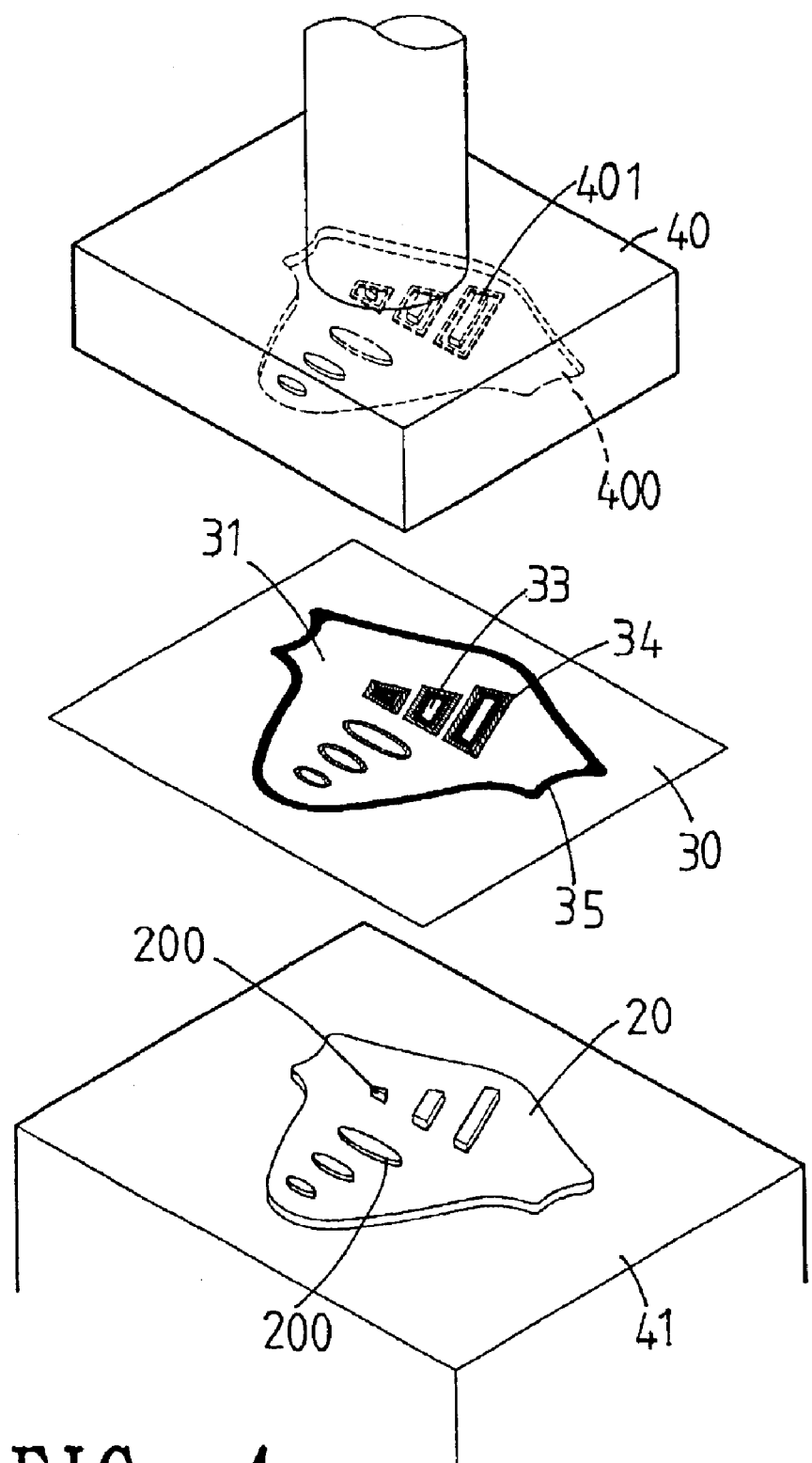
FIG. 4 is an exploded view to show a female mold, a heat transfer decal, and a male mold in the method of the present invention.

As shown in FIG. 6, the colored frame 34 is printed on a peripheral wall 34' of the respective one of the protrusions 200. The wide frame 35 enclosing the pattern 31 as shown in FIG. 4 is printed on the thickness 35' of the rubber plate 20. FIG. 7 shows another embodiment made by the method of the present invention.

While we have shown and described various embodiments in accordance with the present invention, it should be clear to those skilled in the art that further embodiments may be made without departing from the scope and spirit of the present invention.

What is claimed is:

1. A method for manufacturing rubber plate having colored patterns thereon, comprising the following steps:

step 1: preparing a heat transfer decal having a colored pattern thereon, the pattern including a circular mark having a blank portion and a colored frame enclosing the blank portion, the colored frame including a plurality of slits defined through the decal and the slits located at corners of the colored frame;

step 2: preparing a male mold and a rubber plate put on the male mold, at least one protrusion extending from the rubber plate, the decal put on the rubber plate;

step 3: preparing a female mold having a recess defined therein, a configuration of the recess being the same as the rubber plate and the heat transfer decal, at least one concavity defined in an inner surface of the recess in the female mold, a width of the colored frame being equal to a depth of the at least one concavity, and step 4: pressing the decal on the rubber plate between the male mold and the female mold at a high temperature, the rubber plate engaged with the recess of the female mold and the at least one protrusion engaged with the at least one concavity, the pattern attached on the rubber plate and the colored frame attached on a periphery of the at least one protrusion of the rubber plate.

* * * * *